Patented May 8, 1934

1,957,443

UNITED STATES PATENT OFFICE 1,957,443

PROCESS FOR PREPARING CERTAIN ACYL-CHOLINE ESTERS AND THEIR SALTS

Joseph K. Cline, Rahway, N. J., assignor to Merck & Co., Inc., Rahway, N. J., a corporation of New Jersey No Drawing. Application March 30, 1931,
Serial No. 526,549

7 Claims. (Cl. 260—25)

This invention relates to improved processes for the production of salts of aliphatic acid esters of choline. In general such processes are concerned with the esterification (or acylation) of various choline salts with aliphatic acid anhydrides.

Choline and its esters, and more especially acetyl-choline and its salts, have achieved considerable pharmacological importance in recent years, but in spite of the large amount of work which has been done with choline compounds, they have not found the extensive application in human therapy which might be expected from the therapeutic possibilities indicated by the pharmacological studies. This is due to the fact that these preparations have not been in a form and in such a condition of purity which would make them readily available and adaptable for such use.

The most interesting compounds of the series appear to be the salts of acetyl choline, since the general indications are that they would be likely to be the most active forms for therapeutic employment. The production of acetyl choline, its salts, and especially acetyl choline chloride have been the subject of study for many years, but it appears that not until quite recently have they been generally isolated in the form of pure and definitely identified entities.

I am familiar with the work of Baeyer, Nothnagel, Fourneau and Page, Abderhalden and Paffrath, and Hunt, as well as the more recent investigations of Jones and Major in this field. So far as I have been able to learn by a study of the literature, the latter were the first to succeed in isolating the pure acetyl-choline chloride and iodide and to study and describe their physical and chemical properties. I am also familiar with new processes developed by Jones and Major for making their salts.

At the suggestion of Randolph T. Major, I undertook the task of developing further improved processes for the production of such aliphatic esters of choline and salts, and have now succeeded in working out processes which are relatively technically simple, render good yields, and produce preparations of a satisfactory degree of purity.

The old methods used for producing acetyl choline compounds followed reactions under conditions which either did not readily lend themselves to satisfactory isolation, or were not of the best efficiency as to yield and simplicity.

Baeyer, in 1867 and Nothnagel in 1894, carried on their experiments for the production of the chloride by acetylating choline chloride with acetyl chloride; Fourneau and Page, in 1914, reacted upon trimethylamine with chloro-ethyl acetate; while Abderhalden and Paffrath (1925) reported the formation of acetyl-choline by the action of sodium acetate on choline in the presence of an enzyme. But none of these investigators succeeded in isolating the compound or in determining its actual physical and chemical properties. Hunt, in 1915, and thereafter, studied pharmacologically the physiological action of solutions containing choline and its compounds, and reported that he had succeeded in forming acetyl-choline chloride in such solutions. It also does not appear, however, that he at any time succeeded in isolating and defining the pure substances.

Jones and Major, in 1930, succeeded in isolating acetyl choline chloride in the form of a pure salt, and were thus enabled, for the first time, definitely to determine its physical and chemical properties. They produced the salt in the form of a white hygroscopic crystalline powder with a melting point of 151° C. My investigations have confirmed these findings, and I have now found also that I can reproduce this salt, in the same form, by my new process herein disclosed.

While it appears, from what has been said, that a number of chemists acylated choline and its simple salts, none of them seems to have succeeded in isolating pure esters of such salts of choline from the products of their reactions, even though it appears that several investigators did succeed in isolating and defining some of the double salts, e. g., chloro platinates and aurichlorides, which, however, are presumably not of especial medicinal interest in the present state of our knowledge. Thus Baeyer and later Nothnagel were unable to isolate pure acetyl choline chloride from the product that they obtained by the action of acetyl chloride on choline chloride. Hunt did not isolate pure acetyl choline from the product of the interaction of choline and acetyl chloride, nor did Abderhalden and Paffrath obtain pure acetyl choline by the action of sodium acetate on choline in the presence of an enzyme. Contrary to the general assumption, I have now found that I can obtain pure acyl-choline salts by the action of acyl anhydrides on choline salts, according to the equation:

$$(CH_3)_3N(Cl)\,C_2H_4OH + (RCO)_2O \rightarrow (CH_3)_3N(Cl)\,C_2H_4OCOR + RCOOH$$

By way of illustration I set forth in the following example the preferred forms of the process, which can also readily be followed in the production of other analogous esters and salts, by appropriate adaptation.

*Example I—Acetyl choline chloride.*—One part of choline chloride is treated with five parts of acetic anhydride. The mixture is heated at 100° C. in a closed vessel for about one hour in excess of the time required for complete solution. The vessel is then cooled, and the formed acetyl-choline chloride is precipitated by means of the addition of anhydrous ether. The precipitate is filtered off and dried. Thereafter the precipitated mass is purified by dissolving it in absolute alcohol and reprecipitating with dry ether. The formed mass is then filtered off, and washed with anhydrous ether. The final product is obtained in the form of white crystals melting at 149–151° C.

*Example II—Propionyl-choline chloride.*—One part of choline chloride is treated with three parts propionic anhydride. The mixture is heated at 100° for about one hour in excess of the time required for complete solution. The vessel is then cooled and the formed propionyl choline chloride is precipitated by means of the addition of anhydrous ether. The precipitate is filtered and dried. Thereafter the precipitated mass is purified by dissolving it in absolute alcohol filtering if necesary and reprecipitating with dry ether. The formed mass is then filtered off and washed with anhydrous ether. The final product appears as crystals, soluble in alcohol, insoluble in ether, melting at 110° C.

*Example III—Butyryl-choline chloride.*—One part of choline chloride is treated with four parts butyric anhydride. The mixture is heated at 100° C. in a closed vessel for about one hour in excess of the time required for complete solution or about five hours. The vessel is then cooled and the formed butyryl choline chloride is precipitated by means of the addition of anhydrous ether. The precipitate is filtered off and dried. Thereafter the precipitated mass is purified by dissolving it in absolute alcohol, filtering if necessary and reprecipitating with dry ether. The final product is obtained in the form of crystals.

*Example IV—Acetyl-choline acetate.*—One part of choline acetate is treated with five parts of acetic anhydride. The mixture is heated at 100° C. in a closed vessel for about one hour in excess of the time required for complete solution, or a total of about two hours. The vessel is then cooled and the formed acetyl choline acetate is precipitated by means of the addition of anhydrous ether. The precipitate is filtered off and dried. Thereafter the precipitated mass is purified by dissolving in absolute alcohol filtering if necessary and reprecipitating with dry ether. The formed mass is then filtered off and washed with anhydrous ether. The final product is obtained in the form of crystals melting at 146°–148° C.

As will be readily understood, the process may be varied somewhat within reasonable limits as to the actual relative quantities of the materials employed, temperature, etc., without departing from the spirit and scope of the invention disclosed.

It will thus be seen that by this process it is possible to produce a wide range of acyl-choline salts by simply treating the appropriate salts with a given aliphatic acid anhydride, in the manner described. Thus a variety of salts of choline esters suitable for medicinal use which have not hitherto been produced, and which will considerably extend the armamentarium of the physician with respect to a class of remedial agents which are now assuming an important role in therapy.

Having thus set forth my invention, I request the allowance of the following claims:

1. The process of preparing medicinally pure salts of acylated choline, embracing the steps of adding the related salt of choline to an excess of the aliphatic acid anhydride corresponding to the required acylation, fully dissolving the choline salt in the anhydride with the aid of heat, continuing the application of heat until chemical reaction of the acylation of the choline salt by the given anhydride is substantially completed, then cooling and precipitating the reaction product with anhydrous ether, and purifying the product by redissolving the precipitate in absolute alcohol and recrystallizing from the alcoholic solution by means of anhydrous ether.

2. The process of preparing medicinally pure salts of acetyl-choline, embracing the steps of adding the related salt of choline to an excess of acetic anhydride, fully dissolving the choline salt in the anhydride with the aid of heat, continuing the application of heat until acetylation of the salt is substantially completed, then cooling and precipitating the reaction product with anhydrous ether and recrystallizing the precipitate substantially as described.

3. The process of preparing medicinally pure acyl-choline chloride, embracing the steps of dissolving choline chloride in an excess of an aliphatic acid anhydride with the aid of heat until acylation is completed, precipitating the reaction product and recrystallizing substantially as described.

4. The process of preparing medicinally pure acetyl-choline chloride by dissolving choline chloride in an excess of acetic anhydride with the aid of heat, continuing the application of heat until acetylation of the choline chloride is substantially completed, then cooling and precipitating the formed acetyl choline chloride with anhydrous ether, filtering and drying the precipitate, and purifying the same by re-dissolving in absolute alcohol and reprecipitating with anhydrous ether, filtering off the reprecipitated crystals and washing with anhydrous ether.

5. The process of preparing medicinally pure acetyl-choline acetate by dissolving choline acetate in an excess of acetic anhydride with the aid of heat, continuing the application of heat until acetylation of the choline acetate is substantially completed, then cooling and precipitating the formed acetyl choline acetate with anhydrous ether, filtering and drying the precipitate, and purifying the same by redissolving in absolute alcohol and reprecipitating with anhydrous ether, filtering off the reprecipitated crystals and washing with anhydrous ether.

6. The processes of preparing salts of propionyl-choline, embracing the steps of reacting upon the related salt of choline with propionic anhydride, precipitating and purifying the reaction product in substantially the same manner as described in claim 4.

7. As a new medicinal compound, propionyl choline chloride of the formula: $(CH_3)_3N(Cl)-C_2H_4OOC-CH_2-CH_3$ in the form of white crystals soluble in alcohol, insoluble in ether, and melting at 110° C.

JOSEPH K. CLINE.